Patented Sept. 30, 1941

2,257,280

UNITED STATES PATENT OFFICE 2,257,280

COATING COMPOSITION

Herman A. Scholz and Elmer B. Oberg, Evanston, Ill., assignors to United States Gypsum Company, Chicago, Ill., a corporation of Illinois No Drawing. Application October 14, 1937
Serial No. 168,938

11 Claims. (Cl. 106—154)

The present invention relates to an improved paint composition, and more particularly to a water paint composition comprising a protein.

Protein paints are extensively manufactured today, and have many desirable properties which give rise to a large scale market therefor. Prior art paints of this character, however, while satisfactory in many respects, possess a number of disadvantages which detract from their utility and marketability. Thus, for example, the aqueous casein paints of the prior art are often difficult to mix with water, and have undesirable application and brushing qualities when applied to a surface. The most outstanding disadvantage, however, consists in the poor storage properties of prior protein paints. Thus, the best protein paints become thinner upon storage, finally becoming so liquid that the pigments and inert fillers originally suspended therein separate and settle to the bottom of the container; or the prior art paste paints become heavy, forming liver-like gels which cannot be easily broken down by stirring, or readily mixed with water.

The principal object of the present invention is to obviate these and other disadvantages of the prior art protein paints.

A further object is to provide a vegetable protein paint of improved stability, odor, reducing-, application-, and brushing-properties.

A still further object of the present invention is to provide a vegetable protein paint composition which is thixotropic in nature, whereby the solid ingredients of the composition are maintained in suspension during prolonged storage, and the product, when applied to a surface, rapidly solidifies to a gel consistency without curtaining, running, or streaking.

Other objects will be apparent as the invention is hereinafter more fully described.

The foregoing objects may be accomplished by means of the present invention, one aspect of which consists of a paint composition which substantially comprises a vegetable protein and a solubilizing agent. Pigments and fillers may be added as desired, and oils and other liquids may be incorporated therewith, depending upon whether or not the composition is to be sold in the dry state or in the form of paste.

The proteins which may be employed in accordance with the present invention comprise those derived from various vegetable sources. Thus, soy bean protein, peanut protein, corn protein, and other well known vegetable protein materials may be used. It is preferred to use the more purified forms of vegetable protein—for example, those having an average protein content of 90% or better, based on the dry weight of the material. Moreover, the vegetable proteins which are satisfactory for the present invention should not be characterized by an excessively high viscosity, since it has been found that the high viscosity proteins are unsatisfactory, even though they may be prepared from the same raw material and contain approximately the same percentage of protein.

Thus, it has been found that solutions prepared in exactly the same manner with identical solvents, time and temperature of cook, etc., from different soy bean protein compositions containing over 90% protein were not necessarily satisfactory. One of these solutions, having a viscosity reading in a Gardner mobilometer of 265 seconds after a fifteen-minute cook and 528 seconds after a thirty-five minute cook, was found to mix well with pigments to produce the superior product of the present invention. The other solution has a viscosity so great that it could not be accurately measured on the Gardner mobilometer, 1985 seconds being required for the plunger to travel only one quarter of the normal distance when the solution was tested after a fifteen-minute cook, and after a thirty-five minute cook the plunger practically stopped after twenty minutes, for which reason no reading was obtained. This latter solution failed to wet the pigments and could not be converted into anything resembling a paint.

From the foregoing it is apparent that the purity and source of the vegetable protein are not the only criterion for the proteins which may be used in accordance with the present invention. In addition to these properties, the solution made from the vegetable protein must not have such an excessively high viscosity that the incorporation of the other ingredients in the paint composition is prevented.

If preferred, the vegetable proteins of the present invention may be used in conjunction with animal proteins, such as milk casein, whenever it is desirable.

Any of the well known solubilizers of the prior art may be employed as a solvent for the vegetable protein, in accordance with the present invention. Thus, for example, an alkali, such as borax, may be very satisfactorily used. If preferred, however, di- or tri-sodium phosphate or various alkalis and alkaline-reacting materials which are conventionally employed in the art may be substituted for the borax.

In many cases it is desirable to stabilize the paint composition, and this can readily be accomplished by heating either the solution of the vegetable protein or the paint composition itself for approximately fifteen minutes between about 170° F. and about 210° F.

It has been found that another good way to stabilize the vegetable protein forming the base of the paint composition in accordance with this invention is by using a stabilizing agent which may comprise an alkaline salt of an amphoteric metal. Thus, the alkali metal stannates, aluminates, vanadates, antimonates, and the like may be used, the sodium and potassium salts being preferable for economic reasons.

Practically any pigment and filler which may be employed in paint compositions of the prior art may also be employed in the improved protein paint of the present invention. As an example of the type of pigments and fillers which may be used, the following may be mentioned: titanium dioxide, zinc sulfide pigments, mica, talc, barytes, clay, iron oxides, cadmium sulfide, chromium oxide, ultramarine, lead chromate, and the like. Also carbon and bone black, as well as organic pigments of many types, such as toners and lakes, may be employed, depending upon the color desired in the paint.

If it is desired, oils and liquids of various sorts may be incorporated with the foregoing ingredients. For this purpose vegetable oils, such as linseed oil, hempseed oil, tung oil, and perilla oil; fish oils; mineral oils; or essential oils, such as pine oil, may be used for the purpose of waterproofing, preserving, plasticizing, and preventing mold formation in the finished product. Likewise, varnishes, synthetic resins, and like materials can be included.

In addition to the foregoing ingredients there may also be added to the paint composition insolubilizing agents, such as chromium compounds; flexibilizers, such as urea; and small amounts of deodorizing compounds, such as chlorinated phenols, terpineol, and various other odorous compounds which mask the characteristic odor of the protein.

In order to explain the nature of the present invention more clearly, a typical example of a paste paint, which forms one aspect of the present invention, will now be described. It is to be clearly understood, however, that a paste paint composition is selected solely for the purpose of illustration, and the invention is limited neither to the example given nor to the details of the procedure employed in making the same, since the paint composition in accordance with the present invention may also be prepared in a dry form in the manner well known in the art.

In general, the vegetable protein paint in accordance with the present invention consists of a vehicle and relatively inert mineral matter in the form of fillers, pigments, oils, etc. The vehicle consists of a solution of vegetable protein in a solvent, such as borax, and stabilized in accordance with this invention.

A number of different procedures may be used in preparing the paint composition of the present invention. It is perhaps most satisfactory, however, to prepare first a stabilized vegetable protein solution. To this stabilized vegetable protein solution the various pigments, fillers, oils, thinning agents, etc., are then added, after which the mixture is ground in a paint mill, much in the same manner as oil paints are prepared, in order to secure a smooth and uniform product.

*Preparation of the vehicle*

As a specific example, the protein solution or vehicle for the paint composition may be prepared by soaking vegetable protein, such as purified soy bean protein, for example, until it is thoroughly wetted and then adding thereto sodium stannate and borax, with constant agitation, to produce a solution of approximately the following composition:

| | |
|---|---|
| Soy bean protein (90% pure) ____pounds__ | 82.5 |
| Sodium stannate_____do____ | 5.13 |
| Borax_____do____ | 15.0 |
| Water _____gallons__ | 45.0 |

Preferably the solution is heated to a temperature of 170° F. to 210° F. in order to assist in the rate of solution of the protein and also to obtain a more stable product. The elevated temperature is maintained preferably for about fifteen minutes until a thin, smooth, stable solution is obtained. The water which has evaporated during the heating period is desirably replaced, and other liquids, such as alcohol, pine oil, etc., may, if desired, be added at this time in order to impart to the solution the desirable characteristics, such as easy wettability of the pigments and fillers to be subsequently added to the vehicle. The solution prepared in the foregoing manner will have a hydrogen-ion concentration between 8 and 9.

*Compounding the paint*

The protein solution or vehicle prepared in the foregoing manner forms the basis for the paint itself. The latter is made by adding to the protein solution and mixing therewith the pigments, oils, etc., as described above. These ingredients are added to the protein solution gradually, and when all have been incorporated the mixture is ground in a paint mill until uniformly smooth. A preferred percentage composition of the protein paint made in accordance with the foregoing directions is about as follows:

| | |
|---|---|
| Vehicle _____per cent__ | 45.0 |
| (Binder, solvents, water, etc.) | |
| Solids_____do____ | 55.0 |
| (Lithopone _____ 44.0%) | |
| (Talc _____ 11.0%) | |
| | 55.0% |
| | 100.0 |

If desirable, certain odoriferous compounds, such as terpineol and the like, may be added to mask the characteristic odor of the protein. Likewise, drying oils, varnishes, resins, etc., may be added to impart additional desirable characteristics. The finished paste-paint composition is then filled directly into the containers for storage or sale.

The paste paint prepared in the manner described immediately above is not only stabilized against deterioration with age, but is also free from any settling of pigments either in the paste form or in the "reduced" form when mixed with water and ready for application. It is characterized by very good "reducing" qualities—that is to say, it will mix readily with water and will have very good brushing or application qualities. Moreover, the composition when applied to a surface has improved washability, odor, and resistance to cracking or checking.

In addition to the foregoing advantages, the paint composition in accordance with the present invention is characterized to a surprising degree by thixotropy, a property which is of great value not only to the manufacturer but also to the consumer.

A truly thixotropic liquid or medium is relatively stiff or firmly gelled when quiescent. When the gel is disturbed, however, as for example by agitation, the gel becomes fluid and spreads very easily. As soon as the agitation ceases, the material again sets to a gel of the same consistency as it had originally before the disturbance.

From the foregoing it is apparent that a thixotropic paint may be readily poured by the manufacturer into the container and, when placed in storage, sets to a gel which maintains the pigments, fillers, and other solid ingredients in the paint composition in a state of suspension. Prolonged storage in a warehouse or upon dealers' shelves will therefore not result in separation of the ingredients and the formation of a hard cake in the bottom of a container, as is frequently the case with other types of paint compositions.

When the consumer agitates the thixotropic paint composition, as or example by stirring, the material thins down rapidly and can be easily reduced to application consistency and conveniently applied by a brush, spray gun, or by dipping. As soon as it has been applied upon the surface, however, and the disturbing force is removed, the material rapidly solidifies to a gel consistency and remains on the surface without curtaining, running, or streaking effects common to other types of paint products. Furthermore, there is no tendency of the pigments to separate and settle after the paint composition has been "reduced," even on standing "reduced" over night.

The thixotropic properties of the vegetable protein composition of the present invention present many outstanding advantages, and for this reason alone the paint composition of the present invention constitutes an important advance in the art of water-paint manufacture. In addition, however, there are several other advantages, such as odor, better control of the raw materials, and a more uniform supply of a quality protein base than is available for the manufacture of animal casein paints.

In the foregoing detailed description of the present invention it is to be clearly understood that many variations may be made without departing from the spirit and scope thereof. Thus, a vegetable protein may be used which has been incompletely refined; for example, the wet vegetable protein mass prior to the final drying, or other intermediate products of the usual process of purification may be employed instead of the final dried composition. Conventional alkaline solvents may be used to dissolve the soluble vegetable protein from its source and the separated solution, preferably stabilized, employed in the preparation of the paint composition of the present invention, by mixing therewith pigments, fillers, oils, etc., as described above.

While the present invention has been particularly illustrated with reference to a paste paint, it can also be applied to stabilized compositions suitable for use as glues, sizes, paper-coating compositions, and the like. Furthermore, it is plainly evident that the composition of the present invention may be prepared in a dry powder form by omitting the liquid, such as water and/or oil mentioned in the specific example.

Many other variations in details will be apparent to any one skilled in the art. The present invention, therefore, is to be limited only in accordance with the prior art and the appended patent claims.

We claim:

1. A stabilized paint composition comprising a highly purified vegetable protein, an alkaline solvent therefor, and a stabilizer selected from the group consisting of the alkali metal salts of aluminum, vanadium, tin and antimony, said composition having gel-like characteristics when quiescent and possessing thixotropic properties, the stability of said composition having been enhanced by the heating of said protein and solvent for about 15 minutes between approximately 170° F. and approximately 210° F.

2. A stabilized paint composition comprising a highly purified vegetable protein, an alkaline solvent therefor, and a stabilizer selected from the group consisting of the alkali metal salts of aluminum, tin, antimony and vanadium, said composition having gel-like characteristics when quiescent, and possessing thixotropic properties.

3. A stabilized paint composition comprising a highly purified vegetable protein and an alkaline solvent therefor, said composition having been stabilized by heating said protein and solvent for about 15 minutes between approximately 170° F. and approximately 210° F., said composition having gel-like characteristics when quiescent and possessing thixotropic properties.

4. The paint composition of claim 2 wherein said vegetable protein comprises soy bean protein.

5. The paint composition of claim 3 wherein said vegetable protein comprises soy bean protein.

6. The paint composition of claim 2 wherein said stabilizer comprises an alkali metal stannate.

7. The process of producing a stabilized paint composition which comprises dissolving a purified vegetable protein in water containing a sufficient amount of alkaline solvent for the protein to dissolve the same, incorporating with said protein a small proportion of a stabilizer selected from the group consisting of the alkali metal salts of aluminum, vanadium, tin and antimony, heating said solution for at least 15 minutes between approximately 170° F. and approximately 210° F., and incorporating pigment in said solution to obtain a stable paint composition of gel-like characteristics when quiescent and possessing thixotropic properties.

8. The process of producing a stabilized paint composition which comprises dissolving a purified vegetable protein in water containing a sufficient amount of alkaline solvent for the protein to dissolve the same, heating said solution for at least 15 minutes between approximately 170° F. and approximately 210° F. and incorporating a pigment in said solution to obtain a stable paint composition of gel-like characteristics when quiescent and possessing thixotropic properties.

9. The process of producing a stabilized paint composition which comprises dissolving a purified vegetable protein in water containing a sufficient amount of an alkaline solvent for the protein to dissolve the same, incorporating with said protein a small proportion of a stabilizer selected from the group consisting of the alkali metal salts of aluminum, vanadium, tin and antimony, and incorporating pigment in said solution to obtain a stable paint composition of gel-like characteristics when quiescent and possessing thixotropic properties.

10. A stabilized paint composition comprising a highly purified soy bean protein, an alkaline solvent therefor, a pigment, and a stabilizer selected from the group consisting of the alkali metal salts of aluminum, tin, antimony and vanadium, said composition having gel-like characteristics when quiescent and possessing thixotropic properties.

11. A stabilized paint composition comprising a highly purified soy bean protein, an alkali solvent therefor, and a pigment, said composition having been stabilized by heating said protein and solvent for about 15 minutes between approximately 170° F. and approximately 210° F. and said composition having gel-like characteristics when quiescent and possessing thixotropic properties.

HERMAN A. SCHOLZ.
ELMER B. OBERG.